United States Patent Office 3,415,927
Patented Dec. 10, 1968

3,415,927
HEAT MODIFIED DISPERSIBLE GUAR GUM
Irwin Samuel Butensky, Spring Valley, Harold Linwood Smith, Pearl River, N.Y., and George Peter Chrekian, Wanaque, N.J., assignors to American Cyanamid Company, Stamford, Conn., a corporation of Maine
Filed June 9, 1965, Ser. No. 462,510
8 Claims. (Cl. 424—180)

ABSTRACT OF THE DISCLOSURE

The novel process herein disclosed relates to a process of decreasing the rate of hydration of guar gum, which comprises heating the gum for a period of 3 to 30 hours at temperatures of from about 100 to 150° C. Furthermore, novel compositions of matter incorporating guar gum prepared in the above manner are also disclosed.

This invention relates to new slowly hydratable, readily dispersible galactomannans and particularly guar gum, and to methods of producing them.

Guar gum is a galactomannan with D-mannose units linked in a linear chain with a D-galactose molecule on approximately every second mannose unit. The molecular weight is of the order of 220,000. Guar gum has been used for the treatment of certain physiological disorders of the gastro-intestinal tract. Also it has been found effective in treatment of hypercholestermia. The ordinary dose for humans for hypercholereemia is from 3 to 5 grams taken three to four times a day. When it is attempted to incorporate the guar gum into an aqueous medium, the gum hydrates so rapidly that the product soon sets to a semi-solid mass which is not palatable and which is not accepted by human patients. Suspensions of the gum in non-aqueous media such as glycerin have failed to provide a suitable dosage form as they resulted in adherence of the gum to the oral or tracheal mucosa with subsequent discomfort and difficulty in swallowing and breathing.

It has also been proposed to encapsulate finely divided guar gum into gelatin capsules. This dosage form has the disadvantage of requiring the patient to swallow 4 or 5 large capsules at a time. However, a more important drawback is that when the capsules are swallowed the gastric juices dissolve the gelatin and begin to hydrate the outside of the gum contained therein, forming a hydrated shell, which acts as a barrier to further penetration and which results in imperfect use of the guar gum. The same problem is presented by tablets and, as a result, neither of these methods of incorporation have proven to be practical.

According to the present invention the properties of guar gum are modified by heat to produce a product which disperses readily in aqueous media and while not completely unhydratable, hydration is so slow that when dispersed in aqueous media the dispersion remains fluid for a reasonable time, for example 15 to 45 minutes, which is quite adequate for oral use. The product is palatable and is readily accepted by patients.

The temperatures and times are of importance but the ranges are not so narrow that manufacturing problems are presented. In general the temperatures range from 100°–150° C. and the time from 3 to 30 hours. The two factors affect each other, that is to say, the same degree of modification can be obtained by longer heating and lower temperatures or shorter heating at higher temperatures; for example, at 110° C. satisfactory modification is obtainable in about 16 hours on the average, while at 140° C. 8 hours will usually suffice. These times are not exact and will vary somewhat from batch to batch.

It is also possible to coprecipitate the guar gum with gelatin, and for some purposes this is useful and is included within the scope of the present invention. Needless to say, other standard additions such as excipients, flavoring matter, sweeteners, and the like may be used. Also, a suitable wetting agent may be used in small amounts to further increase the dispersibility of the product.

Excessive heating, particularly at high temperatures, can result in damage to the gum but in general the ranges of times and temperatures set out above can be used without adverse effects. In some cases heating causes a very slight discoloration of the gum, which does not affect its therapeutic efficacy nor does it adversely affect the appearance, for guar gum is normally not a pure white material even in the commercially purified state but is usually a light tan and the small amount of discoloration which sometimes occurs merely darkens the shade a little.

The product of the present invention can be used to form aqueous dispersions which maintain their fluidity for sufficient time for practical oral administration and are well tolerated by patients. Exact tests for effect on blood cholesterol are difficult in humans because of the impracticability of treating human beings as test animals and also because the variation from patient to patient is much greater. It is, therefore, customary for quantitative testing of the effect of various medicaments on blood cholesterol levels to use a laboratory animal, for which chicks have been proven to be most acceptable. The tests which will be given below are on these laboratory animals. The extent of human clinical use has not been sufficient to accumulate a sufficient number of thousands of tests to give sufficiently accurate numerical results and, therefore, as far as the testing is concerned in the present specification, the quantitative results obtainable with chicks have been set forth.

The invention will be described in greater detail in conjunction with the specific examples, in which the parts are by weight unless otherwise specified, and in conjunction with the drawings, in which.

As results desired to be obtained can be measured by changes of viscosity, the following standard viscosity measurement will be used employing a Brookfield Viscometer (Model LVT). 125 mg. of the sample is added to 25 ml. of distilled water at 25° C. in the cup of the U.L. adapter of the Brookfield Viscometer. Gentle shaking is used to effect suspension and timing is started as soon as the water makes contact with the sample. After one minute and fifteen seconds the U.L. adapter is installed in the viscometer and lowered into the suspension, which is maintained at 25° C. The viscometer is set for a spindle speed of 60 r.p.m., the start being at one minute and thirty seconds. Readings were then taken on the 100 scale of the viscometer, the first reading at 4 minutes after the water contacted the gum. Readings were then taken at not less than 3 minute intervals until the viscosity reached the point of 100 on the scale. Plots of viscometer readings versus time are shown in the various drawings.

Example 1

Figure 1:
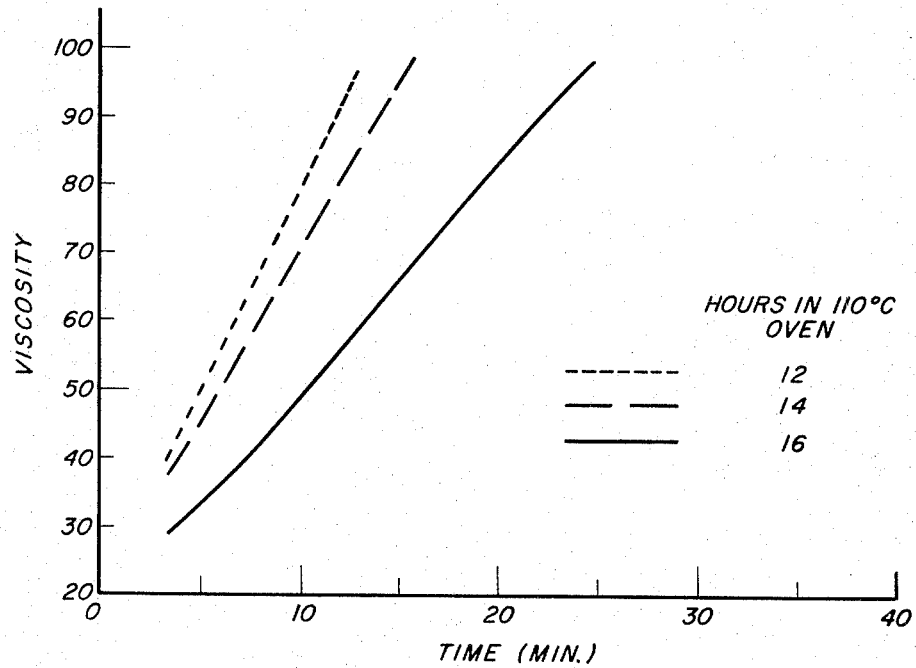
FIGURE 1 is a set of curves of heating at 110° C. for various times.

Eight samples of approximately 3 grams each of guar gum commercially pure flour, which was a light tan, were placed in 15 ml. vials. The vials were capped and placed in an oven maintained at 110° C. Samples were removed at 2-hour intervals and evaluated by the viscosity test referred to above. FIGURE 1 shows results starting with about 12 hours heating. It will be seen that a marked reduction in viscosity results.

Example 2

Figure 2:
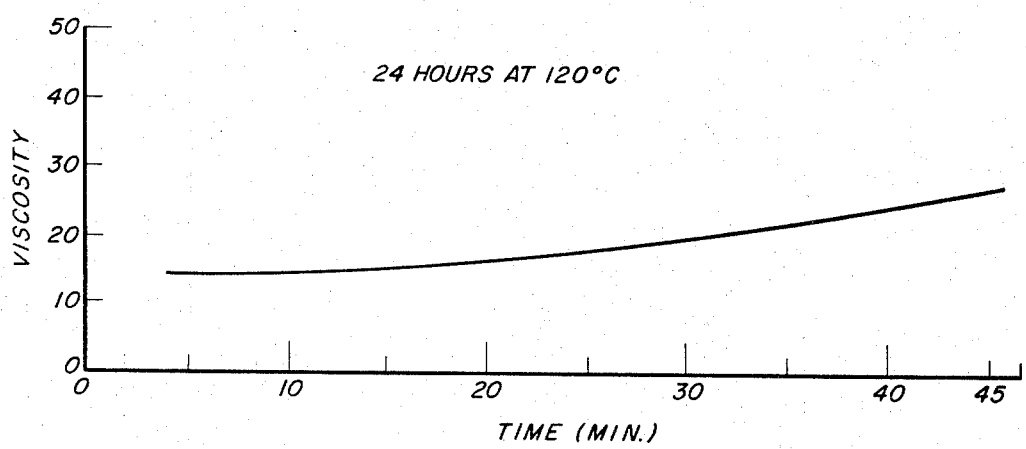
FIGURE 2 is a similar curve for heating at 120° C.

One kg. of guar gum was spread to a depth of 1″ on a tray and placed in an oven maintained at 120° C. for 24 hours. FIGURE 2 shows the viscosity development curve of a 0.5% aqueous dispersion of this material. It will be seen that the dispersion does not thicken to any serious extent.

Example 3

Figure 3:
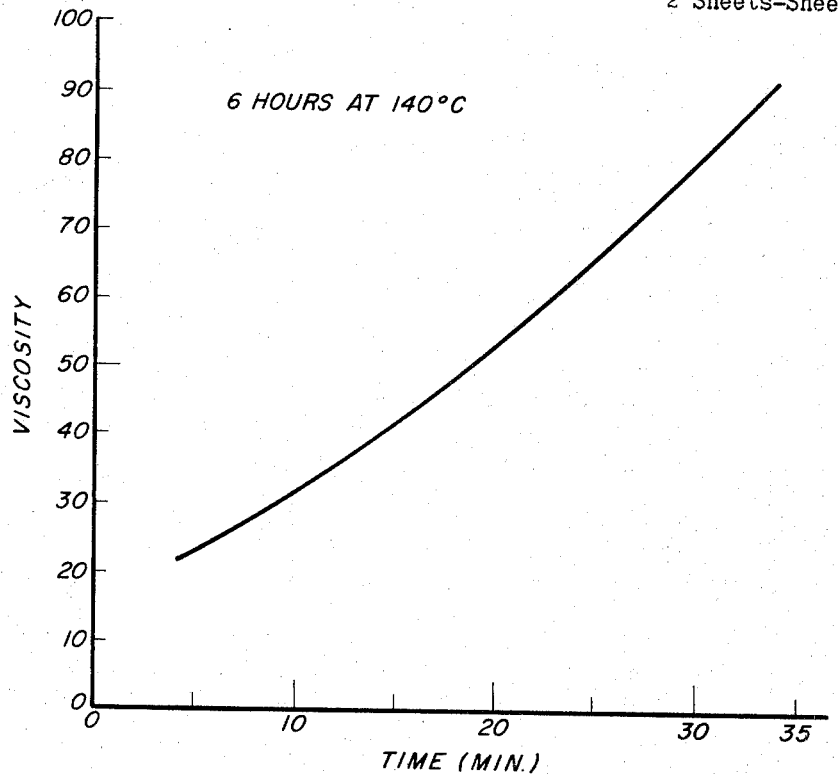
FIGURE 3 is a similar curve for heating at 140° C.
Figure 4:
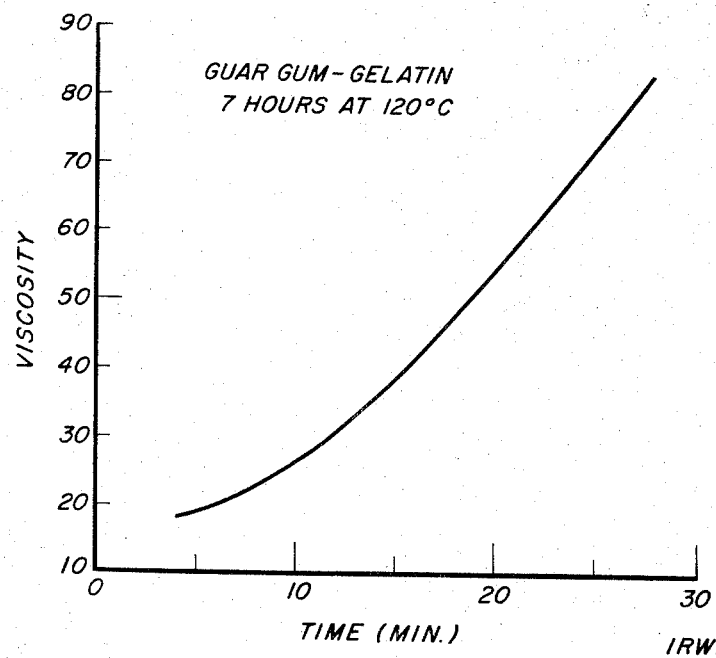
FIGURE 4 is a similar curve for a guar gum-gelatin coprecipitate at 120° C.

One kg. of guar gum was spread to a depth of approximately ⅜″ on a sheet of aluminum foil and placed into an oven maintained at 140° C. for 6 hours. FIGURE 3 shows the viscosity development curve, which it will be noted maintains satisfactory fluidity for a long time.

Example 4

A coprecipitate of guar gum and gelatin was produced by dissolving the gelatin in hot water, adding the guar gum and precipitating with isopropanol. The material was filtered, dried and comminuted, and 1 kg. of this material was spread to a depth of 1″ on a tray and placed in a 120° C. oven for 7 hours. When tested for viscosity the results showed satisfactory fluidity but not for as long a time as the samples of Examples 2 and 3.

Effectiveness in reducing plasma cholesterol was tested with groups of 6 white Leghorn cockerels each. All were fed a diet designed to produce a high level of plasma cholesterol. The diet consisted of 20% crude casein, 61.3% sucrose, dry vitamins A, D and E, and 3% corn oil in which an equal amount of cholesterol was dissolved. The basal diet is 20% deficient in sucrose, and in the tests that follow various amounts of gum guar were added, this was at the expense of the sucrose. Tests continued for 27 days and are recorded in the following tables.

TABLE I
Effect of Unheated Guar Gum and Gum Heated for Various Times at 120° C. in Accordance with Example 2

| Gm. Added per Kg. Diet | | | | Results at end of 27 days | | |
|---|---|---|---|---|---|---|
| Unheated | Heated Hours | | | Av. Plasma Cholesterol Mg., percent | Av. Body Wt. g. | Total Food Consump., kg. |
| | 2 | 7 | 24 | | | |
| | | | | 716 | 237 | 4.50 |
| 30 | | | | 236 | 243 | 5.15 |
| 20 | | | | 296 | 234 | 4.55 |
| | 30 | | | 227 | 248 | 5.25 |
| | 20 | | | 324 | 238 | 4.95 |
| | | 30 | | 246 | 259 | 5.25 |
| | | 20 | | 251 | 258 | 5.10 |
| | | | 30 | 261 | 231 | 4.88 |
| | | | 20 | 338 | 198 | 4.18 |

It will be seen that the maximum reduction in plasma cholesterol as compared to the control which was in the first line of the table occurred with an amount of guar gum 30 gm./kg. It also shows that at this temperature heating for twenty-four hours reduces activity very slightly if at all, the variations being approximately within the experimental error.

TABLE II
Effect of Heated Guar Gum-Gelatin Preparations in Accordance with Example 4

| Gm. Added per Kg. Diet | | | | | Results at end of 27 days | | |
|---|---|---|---|---|---|---|---|
| Unheated Gum | Gelatin | Heated Hours | | | Av. Plasma Cholesterol Mg., percent | Av. Body Wt. g. | Total Food Consump., kg. |
| | | 2 | 7 | 24 | | | |
| | | | | | 747 | 280 | 5.10 |
| 30 | 7.5 | | | | 210 | 264 | 5.25 |
| 20 | 5.0 | | | | 232 | 286 | 5.11 |
| | | 37.5 | | | 254 | 260 | 5.25 |
| | | 25.0 | | | 258 | 282 | 5.55 |
| | | | 37.5 | | 264 | 267 | 5.39 |
| | | | 25.0 | | 337 | 244 | 5.08 |
| | | | | 37.5 | 423 | 260 | 5.14 |
| | | | | 25.0 | 513 | 249 | 4.80 |
| | | | | 0 | 735 | 255 | 4.90 |

It will be seen that when gelatin is present, as in Example 4, the results are substantially the same as when the guar gum alone is heated and also there is shown a very slight cut-off in activity after twenty-four hours.

The following table shows results of different times and different temperatures.

TABLE III
Effect of Heating Guar Gum at Different Times and Temperatures

| Unheated | Hours and Temperatures (° C.) | | | Results at end of 27 days | | |
|---|---|---|---|---|---|---|
| | 6-140 | 8-120 | 16-110 | Av. Plasma Cholesterol Mg., percent | Av. Body Wt. g. | Total Food Consump., kg. |
| | | | | 651 | 270 | 4.95 |
| 30 | | | | 234 | 274 | 5.20 |
| 20 | | | | 290 | 249 | 4.80 |
| | 30 | | | 291 | 231 | 4.30 |
| | 20 | | | 348 | 248 | 4.80 |
| | | 30 | | 308 | 258 | 4.60 |
| | | 20 | | 444 | 268 | 4.70 |
| | | | 30 | 290 | 224 | 4.60 |
| | | | 20 | 290 | 258 | 4.65 |
| | | | | 738 | 245 | 4.63 |

It will be seen that there is little difference between the unheated gum and those heated at the various times and various temperatures. This makes it clear that the viscosity changes which are shown in the drawings may be used for determining the best viscosities and heating times without concern that there will be an adverse effect on the activity of the gum.

We claim:
1. A process for decreasing the rate of hydration of guar gum which comprises heating the guar gum for a period of 3 to 30 hours at temperatures of from about 100 to 150° C.
2. A process according to claim 1 in which the temperature at which the guar gum is heated is from about 110 to 140° C.
3. A process according to claim 2 in which the guar gum is heated for a period of 8 to 16 hours.
4. A process according to claim 1 in which the guar gum is heated for 16 hours at a temperature of 110° C.
5. A process according to claim 1 in which the guar gum is heated for 8 hours at a temperature of 140° C.
6. A process according to claim 1 in which the guar gum is precipitated with a minor portion of gelatin.
7. A dosage unit for oral administration comprising finely divided guar gum, having a decreased rate of hydration, prepared according to the process of claim 1.
8. A dosage unit according to claim 7 in which the guar gum is precipitated with gelatin.

References Cited

UNITED STATES PATENTS 3,148,114  9/1964  Fahrenbach _____ 167—55

OTHER REFERENCES

Chemical Abstracts (1962), 56:6098.
Martin, E. W., et al., "Husa's Pharmaceutical Dispensing," Mack (1959), p. 187.

ALBERT T. MEYERS, Primary Examiner.

V. C. CLARKE, Assistant Examiner.

U.S. Cl. X.R.
260—209; 167—55